March 17, 1942.　　W. W. SLOANE　　2,276,426
SHAKER CONVEYER
Filed Oct. 7, 1940　　2 Sheets-Sheet 1
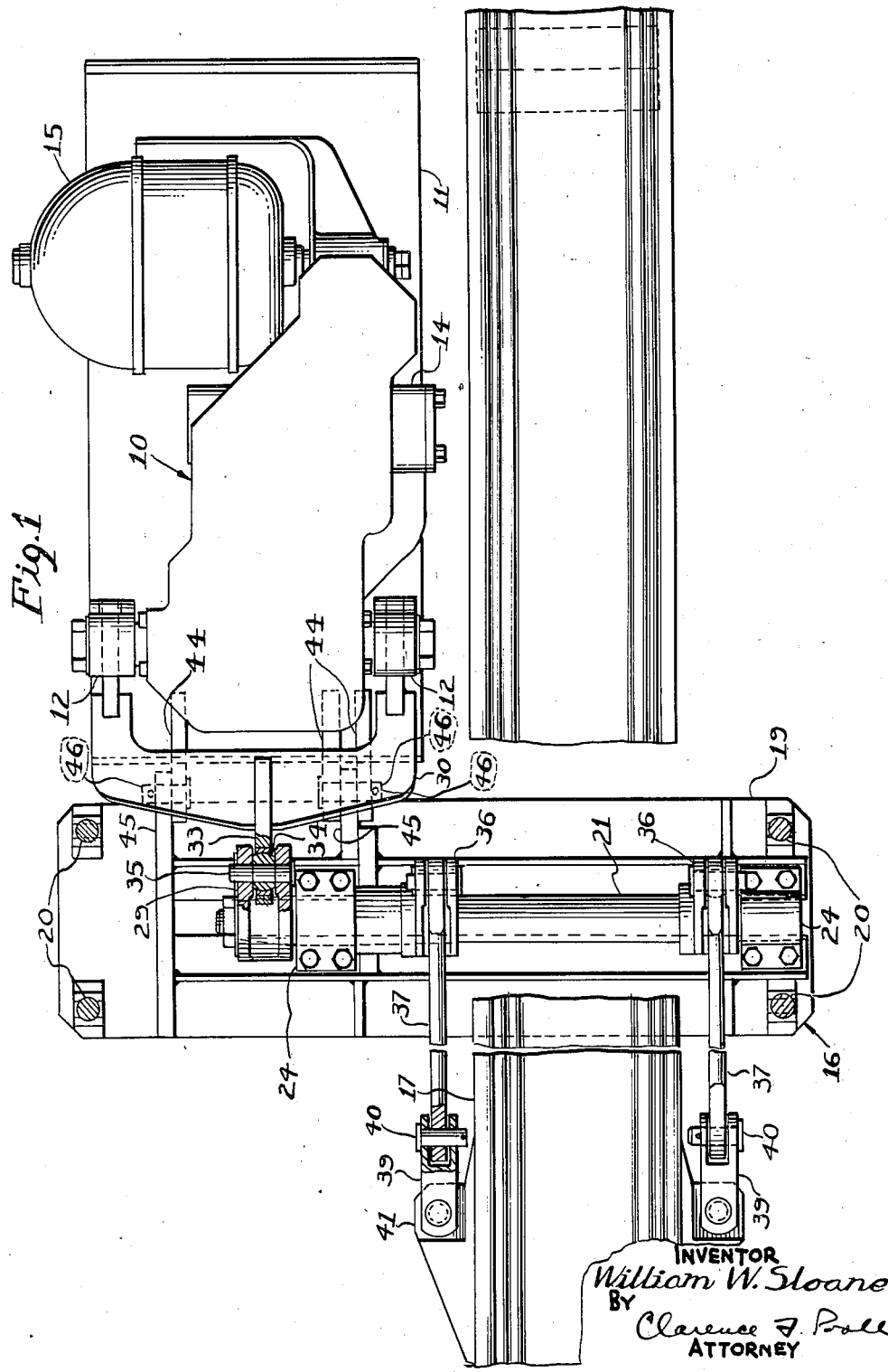
INVENTOR
William W. Sloane
BY
Clarence J. Boll
ATTORNEY March 17, 1942.　　　W. W. SLOANE　　　2,276,426
SHAKER CONVEYER
Filed Oct. 7, 1940　　　2 Sheets-Sheet 2
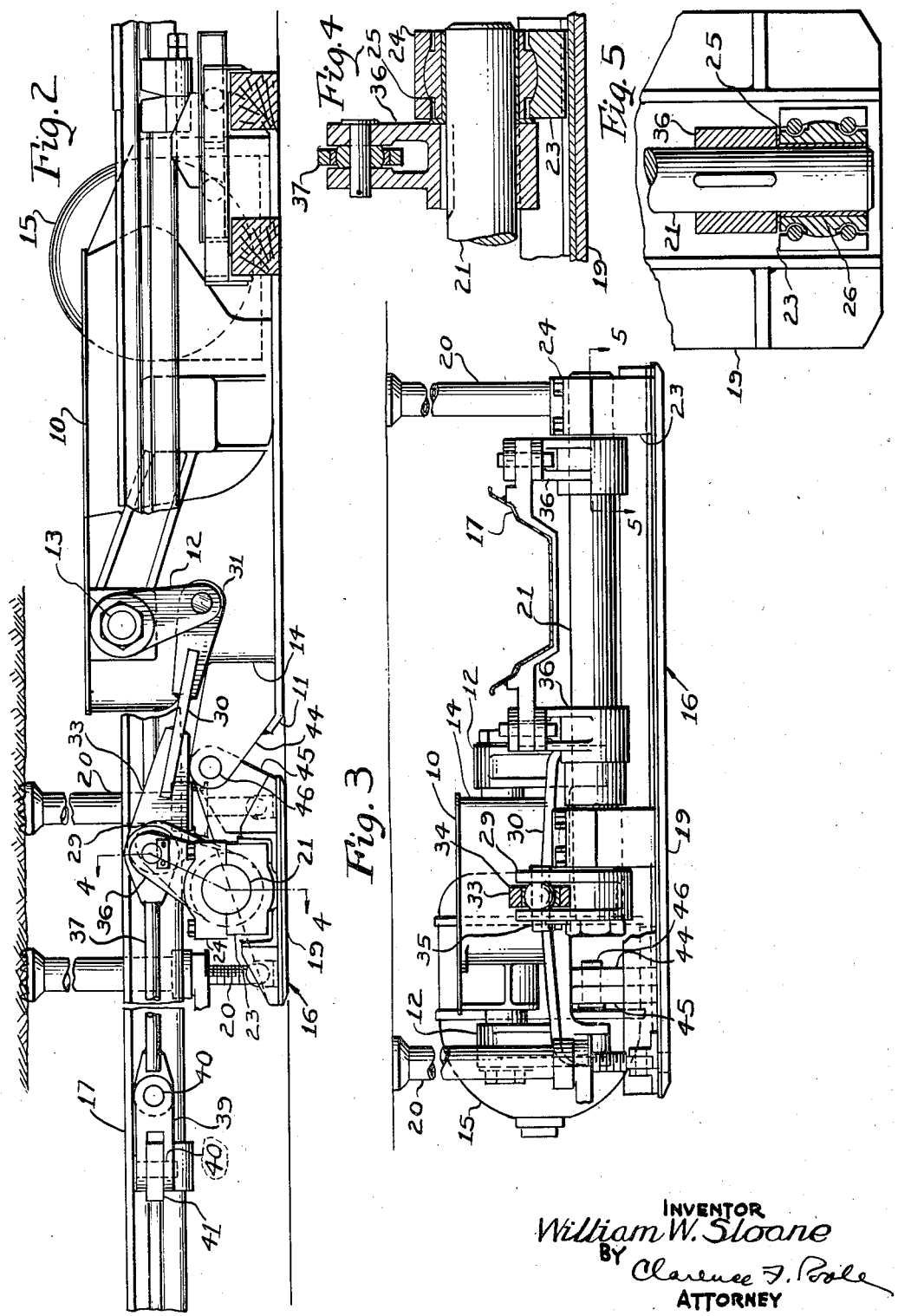
INVENTOR
William W. Sloane
BY Clarence F. Poole
ATTORNEY Patented Mar. 17, 1942

2,276,426

UNITED STATES PATENT OFFICE 2,276,426

SHAKER CONVEYER

William W. Sloane, Chicago, Ill., assignor to Goodman Manufacturing Company, Chicago, Ill., a corporation of Illinois Application October 7, 1940, Serial No. 360,139

7 Claims. (Cl. 198—220)

This invention relates to improvements in shaker conveyers, and more particularly relates to an improved drive mounting for a trough of a shaker conveyer trough line.

The principal objects of my invention are to provide a new and improved drive mounting for a shaker conveyer trough line, separate from the drive mechanism, arranged to transmit the reciprocating drive motion of the drive mechanism to the trough line and adapted to hold the drive mechanism for the conveyer in floating engagement with the ground, to reduce the stresses in the drive mechanism.

A more specific object of my invention is to provide a novel form of drive mounting for reciprocably driving a shaker conveyer trough line arranged along one side of the drive mechanism and including a rocking shaft mounted on a base, adapted to be secured to the ground and to hold the drive mechanism in floating engagement with the ground.

Other objects of my invention will appear from time to time as the following specification proceeds and with reference to the accompanying drawings wherein:

Figure 1 is a top plan view of a shaker conveyer drive mechanism having connection with a drive mounting constructed in accordance with my invention, with a part of the shaker conveyer trough line broken away in order to more clearly show certain details of the drive mounting;

Figure 2 is a view in side elevation of the device shown in Figure 1, with certain parts of the trough broken away in order to more clearly show certain details of my invention;

Figure 3 is an end view of the device shown in Figure 1, with the conveyer trough and the connection from the drive mechanism to the drive mounting shown in transverse section, in order to illustrate certain details of my invention;

Figure 4 is an enlarged fragmentary detail transverse sectional view taken substantially along line 4—4 of Figure 2; and Figure 5 is a fragmentary horizontal sectional view drawn to the same scale as Figure 4 and taken substantially along line 5—5 of Figure 3.

With reference now in particular to the drawings, the embodiment of my invention illustrated therein includes a shaker conveyer drive mechanism generally indicated by reference character 10. Said drive mechanism is herein shown as being mounted on a base plate 11, adapted to rest on the ground, and may be of any form well known to those skilled in the art, so will only herein be described in so far as is necessary to make my present invention clearly understandable. Said drive mechanism includes a pair of spaced apart rocking arms 12, 12 mounted at opposite ends of a transverse shaft 13, journaled in a casing 14. Said shaft and rocking arms are reciprocably driven by a motor 15 through a suitable gear reduction and linkage arrangement, not herein shown or described since it is no part of my present invention. A drive mounting 16 is spaced from the end of said drive mechanism, adjacent the rocking arms 12, 12. Said drive mounting extends to one side of the base 11 and forms a means for driving a trough 17 of a shaker conveyer trough line, herein shown as extending along one side of said drive mechanism.

The drive mounting 16, as herein shown, includes a base 19 adapted to be held in fixed relation with respect to the ground by means of jacks 20, 20, disposed at each corner thereof and adapted to be interposed between said base and the mine roof. A rocking shaft 21 is journaled in said base on suitable spaced apart bearing supports, each including a lower bearing support portion 23 and an upper cap portion 24, adapted to be secured thereto by means of cap screws in the usual manner. Said upper and lower portions, when secured together, have an inner portion of a semi-spherical construction, adapted to receive a semi-spherical outer face of a bearing mounting 25, held from rotation with respect to said bearing support. Said bearing mounting has a bearing sleeve 26 mounted therein. Said bearing mountings may thus move axially within the bearing support members formed by the portions 23 and 24, to align the bearing sleeves 26, 26 upon misalignment of the shaft 21 and to prevent binding of said shaft within said bearing sleeves.

A rocking arm 29 is provided to rock the rocking shaft 21. Said rocking arm is mounted on a projecting end of said shaft, adjacent the drive mechanism, and is driven by a yoke 30. As herein shown, said yoke is pivotally connected at its spaced apart bifurcated ends to the lower ends of the rocking arms 12, 12, by means of pivotal pins 31, 31. A connecting portion 33 of said yoke projects outwardly or forwardly from the central portion thereof and has bearing engagement with a semi-spherical bearing member 34, mounted between the bifurcated ends of the rocking arm 29, on a pin 35.

Rocking arms 36, 36 are mounted on the rocking shaft 21, between the bearing supports formed by the portions 23, 23 and 24, 24, and have puller rods 37, 37 pivotally connected to the outer ends thereof. Said puller rods, as herein shown, extend forwardly from said rocker arms in a generally horizontal plane and have bifurcated connecting members 39, 39 pivotally connected thereto by means of transverse pivotal pins 40, 40. Said connecting members are in turn connected to a transversely extending drive member 41, secured to and extending along the bottom of and projecting from opposite sides of the trough 17.

The drive mechanism 10 is provided with a pair of parallel spaced forwardly projecting connecting ears 44, 44, secured to and projecting forwardly from the forward end of the drive casing 14 and base 11. Said connecting ears are interleaved by and are pivotally connected with parallel spaced bracket members 45, 45 by means of transversely extending pivotal pins 46, 46, to hold said drive mechanism in position on the ground but to permit said drive mechanism to conform to an uneven bottom and have floating engagement with the ground, and thus to relieve the internal stresses from said drive that would be present if it were firmly jacked in position on the ground, particularly where the conveyer trough line extends along one side of the drive mechanism.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer drive mechanism, a base upon which the drive mechanism is mounted, a rocking member mounted on said base and driven to produce a reciprocatory conveying motion, and means for reciprocably driving the conveyer trough line from said drive mechanism and for holding said base from movement during reciprocation of the conveyer including a drive mounting wider than and separate from said drive mechanism and adapted to be secured to the ground and have said drive mechanism pivotally connected thereto adjacent one side of said mounting, a transverse rocking shaft on said drive mounting, a drive connection between said rocking member and rocking shaft, and a drive connection between said rocking shaft and a trough of a shaker conveyer trough line, for reciprocably driving said trough line in such a manner as to cause the movement of material therealong.

2. In a shaker conveyer drive mechanism, a base upon which the drive mechanism is mounted, a rocking member mounted on said base and driven to produce a reciprocatory conveying motion, and means for reciprocably driving the conveyer trough line from said drive mechanism and for holding said base from movement during reciprocation of the conveyer including a drive mounting wider than said base and adapted to be secured to the ground, a transverse rocking shaft on said drive mounting, a drive connection between said rocking member and said rocking shaft, a drive connection between said rocking shaft and a trough of a shaker conveyer trough line, for reciprocably driving said trough line including a rocking arm mounted on said shaft to one side of said drive mechanism, and a pivotal connection between said base and drive unit, permitting floating movement of said base along the ground during reciprocation of the conveyer including an arm extending upwardly and rearwardly from said drive mounting and having transverse pivotal connection with said base.

3. In a drive mechanism for shaker conveyers, a base adapted to rest on the ground, a reciprocably driven rocking member mounted on said base, and means for transferring the motion of said rocking member to the shaker conveyer trough line including a drive mounting separate from said drive mechanism and extending across the front of and to one side of said drive mechanism and adapted to be secured to the ground, a rocking member mounted on said drive mounting for movement about an axis extending transversely of said drive mechanism, a drive connection from said rocking member to the shaker conveyer trough line including a pair of spaced apart rocking arms mounted on said rocking member to one side of said drive mechanism, and a pivotal connection between said frame and base, to hold said base in position on the ground, but to permit floating movement thereof with respect to the ground during reciprocation of the conveyer including a pair of spaced apart arms extending upwardly and rearwardly from said drive mounting and a pair of spaced apart arms extending upwardly and forwardly from said base and having transverse pivotal connection with said first mentioned arms.

4. In a drive mounting for a shaker conveyer trough line, a base adapted to be held in position on the ground during reciprocation of the conveyer, a rocking shaft mounted on said base, a rocking member mounted on one end of said shaft and adapted to be reciprocably driven by a shaker conveyer drive mechanism, a rocking means mounted on said shaft and forming a drive means for a trough of the conveyer trough line, and a pair of spaced apart self-aligning bearings for supporting said shaft, said bearings being to one side of said first mentioned rocking member, and said rocking means for driving said trough being disposed between said bearing members.

5. In a drive mounting for a shaker conveyer trough line, a base adapted to be held in position on the ground during reciprocation of the conveyer and having a conveyer drive mechanism pivotally connected thereto adjacent one side thereof, to form a means for holding said drive mechanism in position, but to permit floating movement thereof, a rocking shaft mounted on said base and extending beyond one side of said drive mechanism, a rocking member mounted on said shaft, for rocking said shaft, said rocking member being rocked by said conveyer drive mechanism, and other rocking means mounted on said shaft to one side of said drive mechanism and having drive connection with a trough of a shaker conveyer trough line.

6. In a drive mounting for a shaker conveyer trough line, a base adapted to be held in position on the ground during reciprocation of the conveyer and having a conveyer drive mechanism pivotally connected thereto to form a means for holding said drive mechanism in position, but to permit floating movement thereof, a rocking shaft mounted on said base and extending beyond one side of said drive mechanism, a rocking member mounted on said shaft, for rocking said shaft, said rocking member being rocked by said conveyer drive mechanism, other rocking means mounted on said shaft to one side of said drive mechanism and having drive connection with a trough of a shaker conveyer trough line, and a pair of spaced apart self-aligning bearings for supporting said shaft in such a manner as to prevent binding thereof.

7. In a drive mounting for a shaker conveyer trough line, a base adapted to be held in position on the ground during reciprocation of the conveyer and having a conveyer drive mechanism pivotally connected thereto to form a means for holding said drive mechanism in position, but to permit floating movement thereof, a rocking shaft mounted on said base and extending beyond one side of said drive mechanism, a rocking member mounted on said shaft, for rocking said shaft, said rocking member being rocked by said conveyer drive mechanism, other rocking means mounted on said shaft to one side of said drive mechanism and having drive connection with a trough of a shaker conveyer trough line, and a pair of spaced apart self-aligning bearings for supporting said shaft in such a manner as to prevent binding thereof, said bearings being on opposite sides of said rocking means and one of said bearings being between said rocking member and said rocking means.

WILLIAM W. SLOANE.